US009203458B2

(12) United States Patent
Sutherland et al.

(10) Patent No.: US 9,203,458 B2
(45) Date of Patent: Dec. 1, 2015

(54) INLINE TRAY ASSEMBLY FOR RECEIVING MULTIPLE DATA CARDS

(71) Applicant: Google Technology Holdings LLC, Mountain View, CA (US)

(72) Inventors: Timothy J. Sutherland, Gurnee, IL (US); Paul L. Fordham, Wauconda, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 521 days.

(21) Appl. No.: 13/652,892

(22) Filed: Oct. 16, 2012

(65) Prior Publication Data
US 2014/0104767 A1    Apr. 17, 2014

(51) Int. Cl.
H04B 1/38         (2015.01)
H04B 1/3816      (2015.01)
(52) U.S. Cl.
CPC .................... H04B 1/3816 (2013.01)
(58) Field of Classification Search
CPC ...................................... H04B 1/3816
See application file for complete search history.

(56) References Cited

U.S. PATENT DOCUMENTS

| | | | |
|---|---|---|---|
| 8,950,681 B2* | 2/2015 | Lepp et al. .................... | 235/492 |
| 2001/0053634 A1 | 12/2001 | Camacho | |
| 2004/0092149 A1* | 5/2004 | Scuteri et al. ................ | 439/326 |
| 2009/0298541 A1* | 12/2009 | Roh et al. ..................... | 455/558 |
| 2010/0165589 A1* | 7/2010 | Zhou ............................. | 361/759 |
| 2010/0195279 A1* | 8/2010 | Michael .................... | 361/679.41 |
| 2010/0234070 A1* | 9/2010 | Li et al. ......................... | 455/558 |
| 2013/0235548 A1* | 9/2013 | Chang ........................... | 361/810 |
| 2013/0258605 A1* | 10/2013 | Hsu ............................... | 361/727 |

FOREIGN PATENT DOCUMENTS

| | | |
|---|---|---|
| EP | 1308874 A2 | 5/2003 |
| KR | 20120068997 A | 6/2012 |

OTHER PUBLICATIONS

Patent Cooperation Treaty, International Search Report and Written Opinion of the International Searching Authority for International Application No. PCT/US2013/059127, Nov. 8, 2013, 9 pages.
DIYTrade, Dual sim card adapter, http://www.diytrade.com/china/pd/4314354/Dual_sim_card_adapter.html, USA Euroluck Hongkong Union, Holding Limited, downloaded from internet: Oct. 16, 2012, all pages.

* cited by examiner

Primary Examiner — Lisa Lea Edmonds
(74) Attorney, Agent, or Firm — Faegre Baker Daniels LLP

(57) ABSTRACT

An inline tray assembly (300) for receiving multiple data cards is shown. The tray assembly (300) can include: an inline tray assembly (300) including a tray module (302) configured to receive multiple different data cards and a tray receptacle (304). The tray module (302) has a first data card receiving cavity (306) for receiving a first data card (308) and a second data card receiving cavity (310) for receiving a second data card (312). The first and the second data card receiving cavities (306) and (310) are shown aligned along an x-axis, in compass (314). The tray receptacle (304) has an opening (316) or interface configured to receive the tray module (302). Advantageously, this structure provides an improved assembly capable of accepting two or more data cards in a small area and minimizes the possibility of damage to the data cards. Thus, a user can easily insert and place data cards in a device.

19 Claims, 5 Drawing Sheets

INLINE TRAY ASSEMBLY FOR RECEIVING MULTIPLE DATA CARDS

BACKGROUND OF THE INVENTION

1. Field of the Disclosure

The disclosure relates in general to electronic communication devices and more particularly to an inline tray assembly for receiving multiple data cards.

2. Background Art

Mobile electronic devices, such as cellular phones, tablets, and the like, are being made to accept multiple types of end-user external inserted cards. An example of an inserted card is a Subscriber Identity Module card (SIM card) which is an integrated circuit that securely stores the International Mobile Subscriber Identity and related keys used to identify and authenticate subscribers, store a limited amount of data such as 250 contact names and phone numbers, as well as subscribers identity, security, and personal information to identify users on a cell phone network, and can be transferred between different mobile devices. SIM cards have become smaller over the years. They come in the full-size SIM $1^{st}$ form factor (1FF), mini-SIM $2^{nd}$ form-factor (2FF), micro-SIM $3^{rd}$ form-factor (3FF), and nano-SIM $4^{th}$ form-factor (4FF). The 4FF SIM can be put into adapters for use as a 2FF or 3FF SIM, so they are backward compatible. On some networks, the mobile phone is locked to its carrier SIM card, meaning that the phone only works with SIM cards from the specific carrier.

Secure Device cards (SD cards), also known as Super Density cards, are another example of inserted cards used in mobile devices. SD cards are non-volatile memory cards used to store data for use in a range of portable devices. SD cards retain data without drawing power from the battery of a mobile device. SD cards are presently available in three different form factors. The standard SD, the miniSD, and the microSD (originally named the TransFlash or TF). The microSD (uSD) is the smallest memory card that can presently be purchased. It is about a quarter of the size of a standard SD card. There are adapters which make the uSD able to fit in the products which have slots for standard SD and miniSD. The uSD format was created by the company SanDisk. The amount of power used by uSD cards is different for each card because they are made by different manufacturers, but the card typically has a range of 20-100 mA at a supply voltage of 2.2 V.

The United States and Europe are SIM and uSD supported. Asia is dual SIM supported. However, each company producing SIM cards and each country uses its own version of SIM cards. Tablet devices use SIM cards if they have a cell version, or uSD cards if they have a WiFi only version. Music players use uSD cards.

Within a mobile device, different connectors are needed to load different cards. However, one card connector only loads one corresponding card, so the mobile device needs to be designed with different card connectors. Using multiple different connectors can be costly from a supply chain standpoint because multiple different connectors must be stocked. Therefore, a card connector which can load different cards is desirable.

In the past, data cards have been used in devices with separate connection and retention footprints. They are often cumbersome, take up a lot of space and can cause damage to a data card when it is forced into the wrong retention footprint.

It is therefore, desirable to provide an inline tray assembly for multiple data cards that overcomes many of the preceding disadvantages.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
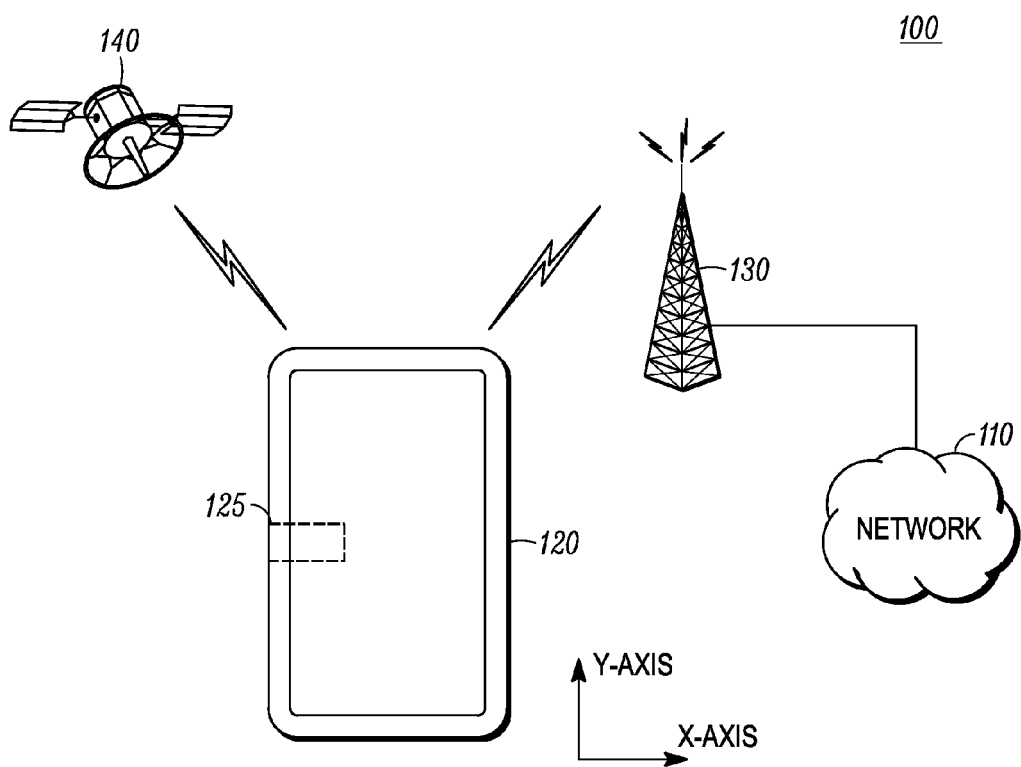
FIG. 1 is an exemplary block diagram of a communication system according to one embodiment.
Figure 2:
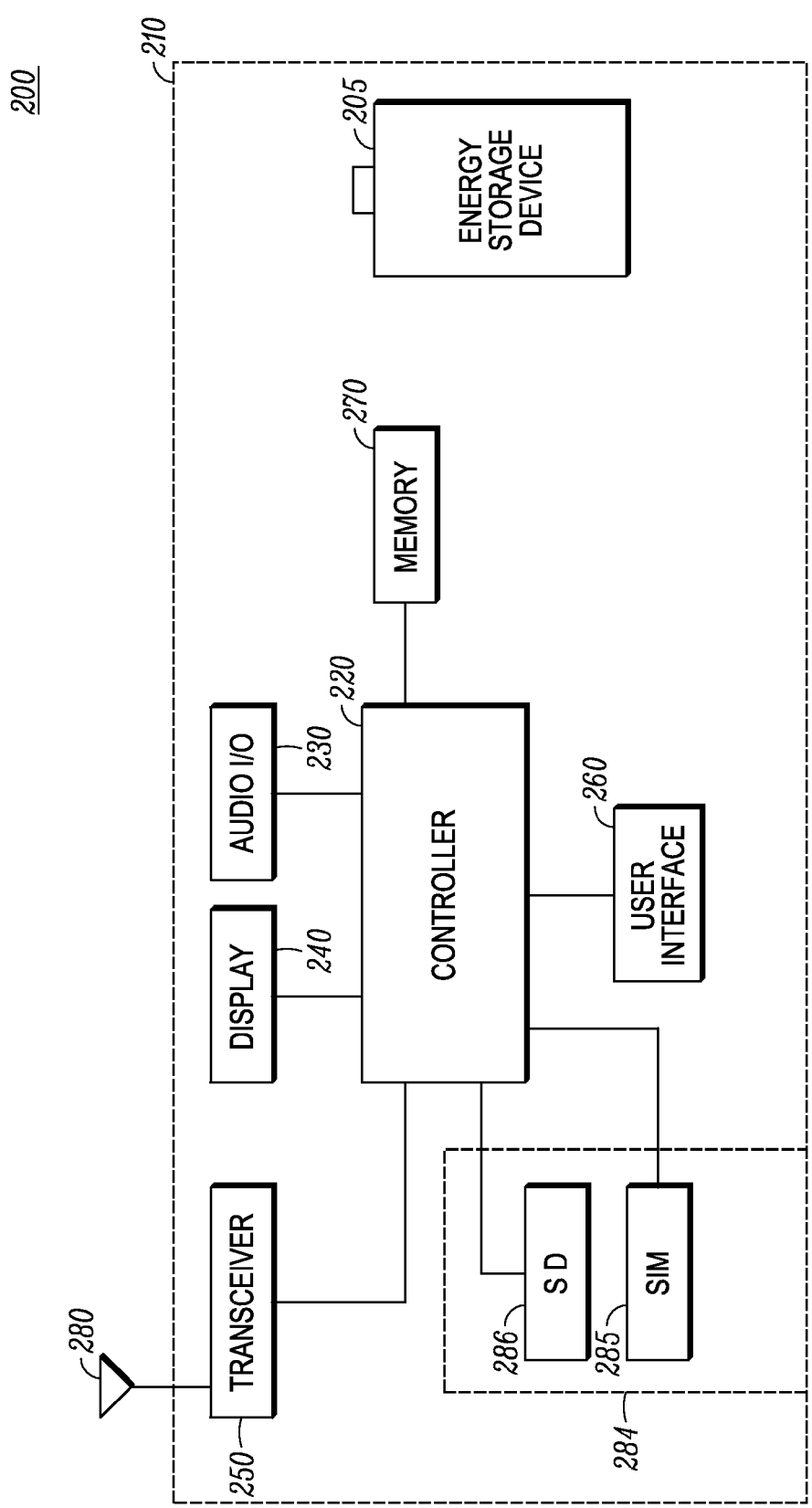
FIG. 2 is an exemplary block diagram of a wireless communication device with an inline tray assembly according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a wearable device, a cellular telephone, a personal digital assistant, a pager, a personal computer, a tablet, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can include a wireless communication device, which can communicate with the network 110 and with other devices on the network 110 by sending and receiving wireless signals via the base station 130, which may also comprise local area, and/or personal area access points, as detailed more fully herein. The terminal 120 includes an inline tray assembly 125 in phantom and is shown being in communication with a global positioning system (GPS) 140 satellite, global navigation satellite system (GNSS) or the like, for position sensing and determination. FIG. 2 is an exemplary block diagram of a wireless communication device 200 configured with an energy storage device, battery or module 205, such as in the terminal 120, for example. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and an inline tray assembly 284 with data cards in the form of a SIM card 285 and SD card 286 coupled to the controller 220.

The display 240 can be a liquid crystal display (LCD), a light emitting diode (LED) display, a plasma display, a touch screen display or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch screen or pad, a joystick, an additional display, or any other device useful for providing an interface between a user and an electronic device.

The memory 270 may include a random access memory, a read only memory, an optical memory or any other memory that can be coupled to a wireless communication device.

Figure 3:
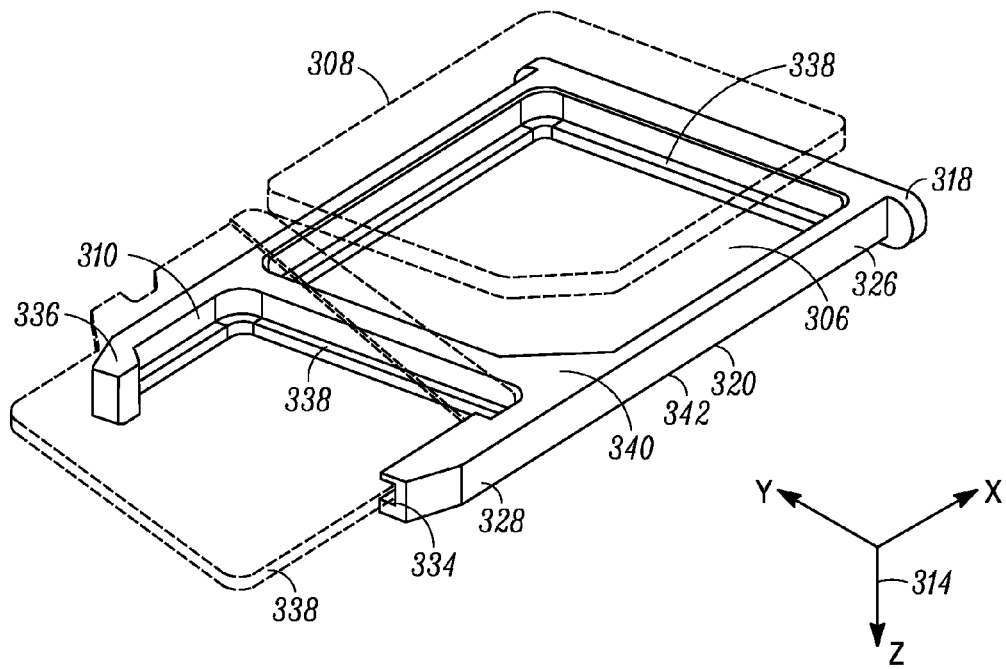
FIG. 3 is an exemplary perspective view of an inline tray assembly shown with a first and second data card being placed in the inline tray assembly according to one embodiment.
Figure 4:
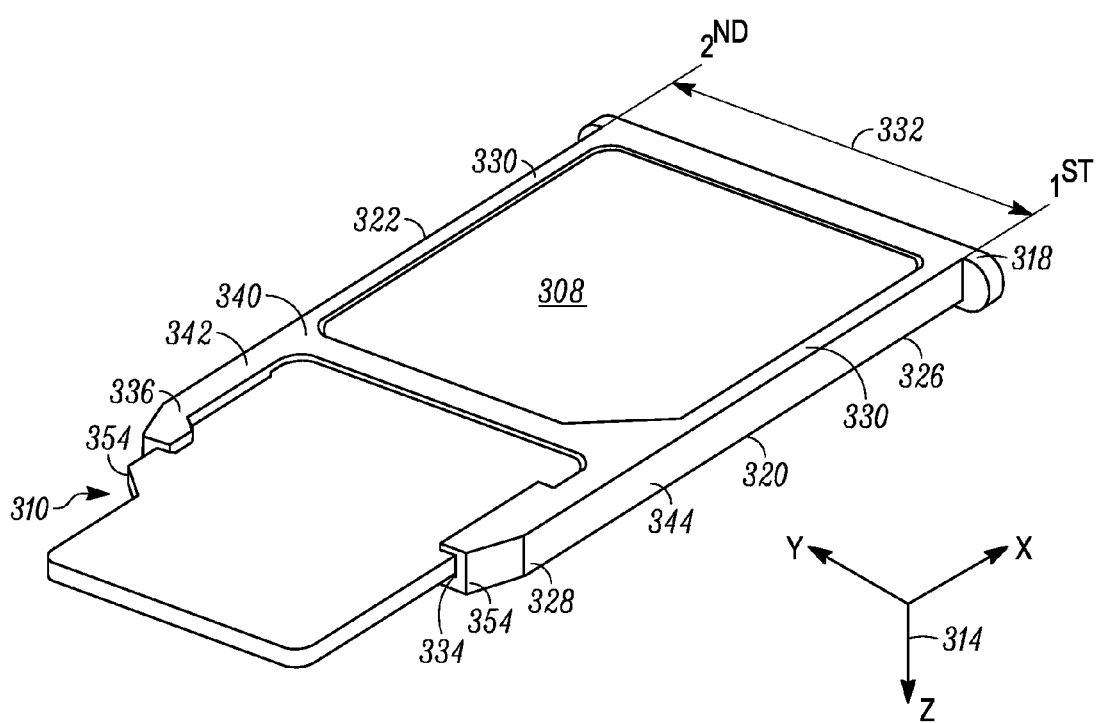
FIG. 4 is an exemplary perspective view of an inline tray assembly shown with a first and second data card populated in the inline tray assembly according to one embodiment.
Figure 5:
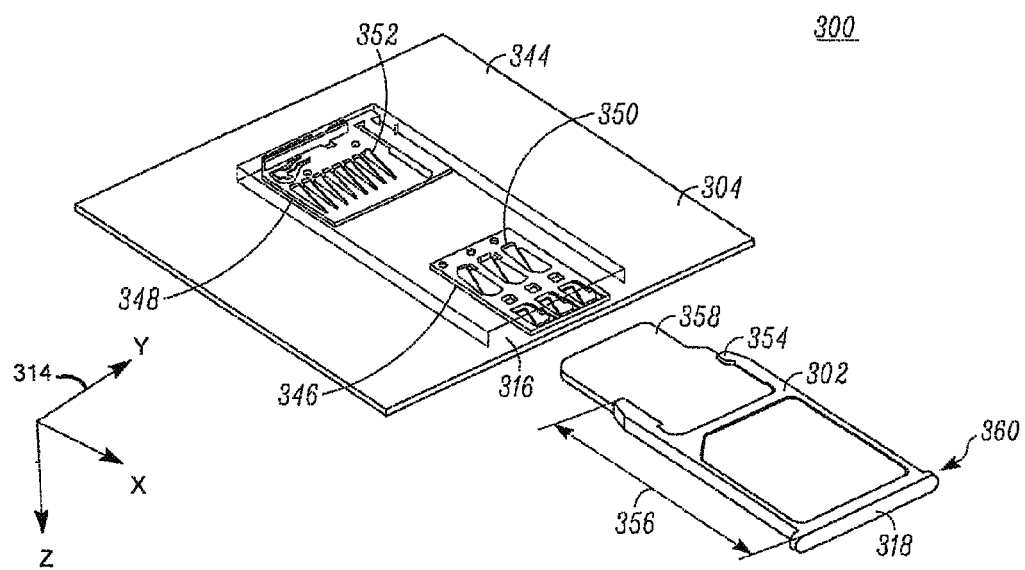
FIG. 5 is an exemplary perspective view of an inline tray assembly including a tray module populated with a first and a second data card and a tray receptacle, with the tray module aligned and in position to be interconnected with the tray receptacle according to one embodiment.

Referring to the FIGS. 3-5, an inline tray assembly 300 for receiving multiple data cards is shown. The tray assembly 300 can include: an inline tray assembly 300 including a tray module 302 configured to receive multiple different data cards and a tray receptacle 304. The tray module 302 has a first data card receiving cavity 306 for receiving a first data card 308 and a second data card receiving cavity 310 for receiving a second data card 312 The first and the second data card receiving cavities 306 and 310 are shown aligned along an x-axis, in compass 314. The tray receptacle 304 has an opening 316 or interface configured to receive the tray module 302.

Advantageously, this structure provides an improved arrangement adapted to accept a plurality of data cards in a small geometric area and minimizes the possibility of data cards being damaged, which is effective, economical, and easy to use, as detailed herein. In addition, this structure can accept a plurality of data cards in a user-friendly single assembly with the receptacles being configured to reject the wrong card. Thus, a user can easily insert and place data cards in a wireless communication device.

The inline tray assembly 300 can include the first data card receiving cavity 306 being complementarily configured to only receive a first data card 308 and the second data card receiving cavity 310 being complementarily configured to only receive the second data card 312, which can help in minimizing the possibility to data cards being damaged by users, In one embodiment, the tray module 302 is a shallow platform designed for carrying data cards and can be made of a plastic and metal. The tray module 302 can be flat, with boundaries and ledges, to minimize the possibility of a data card from sliding off of it, during handling, insertion and removal. As should be understood, various shapes can be used, but is generally rectangular in form, with a handle or door 318.

The tray module 302 includes a door 318 and a first rail 320 and a second rail 322 extending along an x-axis, as shown by compass 314, from a proximal portion 326 to a distal portion 328 and being separated by a width 332 along a y-axis sufficiently to provide an outer boundary 330 around at least a portion of the first and the second data cards 308 and 312 along the y-axis. As shown in FIG. 3, the distal portion 328 of the first rail 320 includes an inwardly facing channel section (reverse "C") for receiving an edge 338 of the first data card 308 at an angle upon initial placement of the second data card 312, and the second rail 322 includes an inwardly extending tab 336, for providing ease of insertion and a snug fit in the second data card receiving cavity 310. Stated differently, this construction allows the second data card 312 to substantially remain in place, during handling, insertion and removal of the tray module 302 with respect to the tray receptacle 304.

In one embodiment, the tray module 302 includes the proximal portion 326 of the first and the second rails 320 and 322 includes inwardly extending ledges 338 adapted to support the first data card 308 around the cavity 306, for an enhanced seating of the first data card 308.

The tray module can include a door 318, a first rail 320 and a second rail 322 extending from a proximal portion 326 to a distal portion 328 and a middle support section 340 being substantially parallel to the door 318, the middle support section 340 connecting a middle section 342 of the first rail 320 and a second rail 322, to provide enhanced structure and integrity between the first data card receiving cavity 306 and the second data card receiving cavity 310.

The tray receptacle 304 can include a planar shelf 344 including spring contacts, for enhanced connection. The shelf 344 can be a substrate, a printed circuit board and the like.

In one embodiment, the shelf 344 includes a proximal section 346 and a distal section 348, the proximal section 346 including a first set of contacts 350 for connection to the first data card 306 contacts when the first data card 306 is inserted into the first data card receiving cavity 306 and the distal section 348 includes a second set of contacts 352 for connection to the second data card 312 contacts when the second data card 312 is inserted into the second data card receiving cavity 310.

Figure 6:
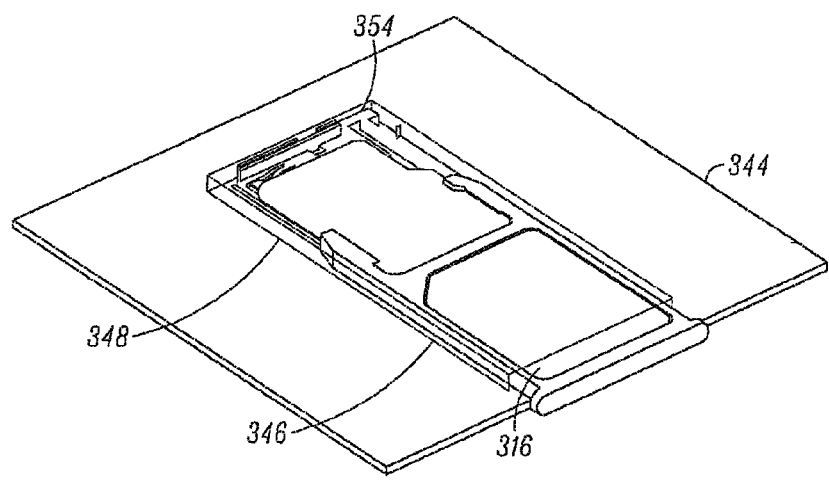
FIG. 6 is an exemplary perspective view of an inline tray assembly including a tray module populated with a first and a second data card and a tray receptacle, with the tray module inserted and interconnected with the tray receptacle according to one embodiment.
Figure 7:
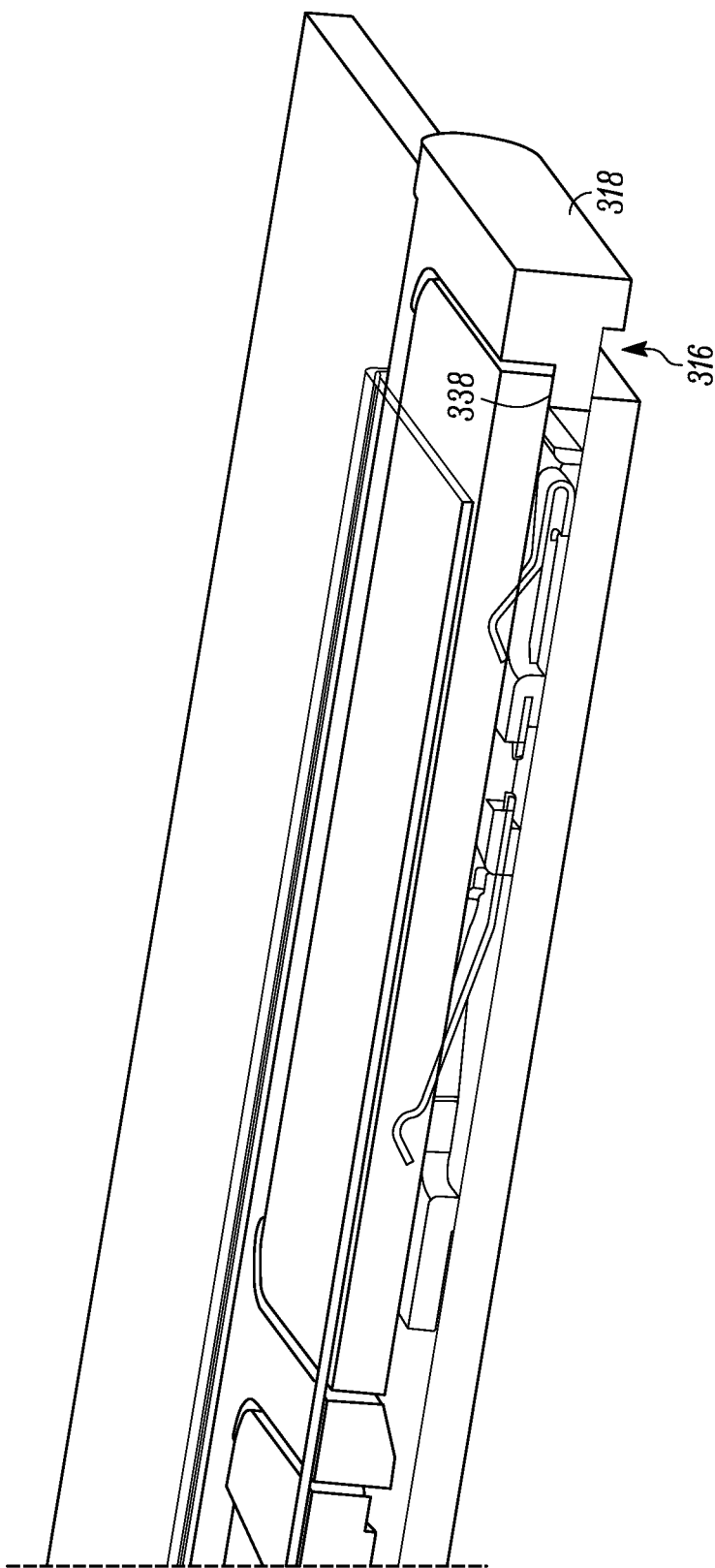
FIG. 7 is an exemplary enlarged partial sectional view of an inline tray assembly including a tray module populated with a first and a second data card and a tray receptacle, with the tray module inserted and interconnected with the tray receptacle in FIG. 6, with a door in a shut position according to one embodiment.

In a preferred embodiment, the first rail 320 and the second rail 322 include a termination point 354 terminating short of the second set of contacts 352, as shown in FIG. 6, so as not to interfere with the second set of contacts 352, when the tray module 302 is insert or removed from the tray receptacle 304. Thus, the first rail and a second rails 320 and 322 terminate at a predetermined length 356 along an x-axis, for ease of insertion and removal and proper connection of second data card 312 contacts with the second set of contacts 352. The length 356 allows the contacts to easily connect without structural interference, and the second data card 312 extends 358 past the termination point 354, in a preferred embodiment.

In a preferred arrangement, the tray module 302 provides an inline construction for receiving a plurality of data cards, such as the first and the second data cards 308 and 312 in alignment, along an x-axis and can include a locking mechanism 360 including at least one of a push-push mechanism and push-pull mechanism. For example, the locking mechanism 360 can include a push-push ejector for guiding and/or ejecting the tray module 302. A user can insert the tray module 302 in the tray receptacle 304, as shown in FIG. 6 and withdraw it out, as shown in FIG. 5, with his or her fingers.

As shown in FIG. 1, the tray module 302 can comprise an installable and removable data card access tray utilized in a wireless communication device, such as in a cell phone, computing device or tablet.

In more detail, the tray module 302 is moveable from an open position extending outwardly, as shown in FIG. 5, from an electronic device for access, to a closed position disposed in an interior, of an electronic device, as shown in FIGS. 1 and 6.

As an example, the first data card 308 and the second data card 312 include at least one of: a subscriber identity module card (SIM card), full-size SIM $1^{st}$ form factor (1FF) card, mini-SIM $2^{nd}$ form-factor (2FF) card, micro-SIM $3^{rd}$ form-factor (3FF) card, nano-SIM $4^{th}$ form-factor (4FF) card, secure device card (SD card), standard SD card, miniSD card, microSD (uSD) card, memory card, storage card, and expanded external memory card. In a preferred embodiment, the first data card 308 includes a SIM and the second data card 312 includes a SD card.

As shown in the figures, the tray module 302 is generally rectangular and has a narrow profile or minimal z-dimension, for taking up minimal space in a portable device, for example.

In another embodiment, a wireless communication device, in the form of a user terminal 120 is disclosed in FIG. 1. The wireless communication device can include: a housing 210; a controller 230 coupled to the housing 210, the controller 230 configured to control the operations of a wireless communication device; and an inline tray assembly 300 including a tray module 302 configured to receive multiple different data cards and a tray receptacle 304; the tray module 302 having a first data card receiving cavity 306 for receiving a first data card 308 and a second data card receiving cavity 310 for receiving a second data card 312, the first and the second data card receiving cavities 306 and 310 being aligned along an x-axis, and the tray receptacle 304 having an opening configured to receive the tray module 302.

Advantageously, the tray assembly 300 is portable and can be easily integrated into the housing and/or a circuit board of a wireless communication device. Advantageously, this arrangement can allow a supplier to stock a single assembly that can be used across a platform of wireless communication devices, to lower costs and increase profits, by using less parts.

In one embodiment, the first data card receiving cavity 306 is complementarily configured to only receive a first data card 308 and the second data card receiving cavity 310 is complementarily configured to only receive a second data card 312. This construction can minimize damage to data cards, by users trying to insert the wrong cards into the wrong receptacle, for example.

In one embodiment, the tray receptacle 304 includes a shelf 344 including a proximal section 346 and a distal section 348, the proximal section 346 including a first set of contacts 350 for connection to the first data card 308 when the first data card 308 is inserted into the first data card receiving cavity 306 and the first rail 320 and a second rail 322 terminating short of the second set of contacts 352, as detailed previously. Advantageously, the tray receptacle 304 can have two sets of contacts, each set specific to one of the memory cards accepted.

In one exemplary use case, a first data card 308, in the form of a SIM card, is loaded into the tray module 302 in the z direction, as shown in FIG. 3. A second data card 312, in the form of a T-flash, is toed in to channel section 334 and then dropped on the other side to interconnect with the tab 336. The notch and the tab 336 substantially prevent the card from being dislodged during handling and insertion and removal of the tray module 302, as shown in FIG. 4. Next, the tray module 302 with the cards 308 and 312 is loaded through an opening 316, as shown in FIG. 6. The tray module 302 is shown in FIG. 6, with the door 318 shut. Ejection can be accomplished via a push push mechanism at the end of the tray. The user would use his or her fingernails to push on the end of the tray, eliminating the need for a tool.

In an alternative embodiment, the first data card 308 and second data card 312 can include: (i) a SIM and T-flash with complimentarily configured cavities; (ii) SIM and SIM with complimentarily configured cavities; and (iii) SIM, SIM and T-flash with three complimentarily configured cavities.

Although embodiments have been shown and described, it is to be understood that various modifications, substitutions, and rearrangements of parts, components, and steps, as well as other uses can be made by those skilled in the art without departing from the novel spirit and scope of the invention.

What is claimed is:

1. A tray module, comprising:
    a door;
    a first rail extending from the door, the first rail having a proximal portion near the door and a distal portion, the distal portion of the first rail including an inwardly facing channel section;
    a second rail extending from the door, the second rail having a proximal portion near the door and a distal portion, the distal portion of the second rail including an inwardly extending tab;
    a first data card receiving cavity for receiving a first data card, the first data receiving cavity between the first rail and the second rail; and
    a second data card receiving cavity for receiving a second data card, the second data receiving cavity between the first rail and the second rail, and the first and the second data card receiving cavities are aligned along an x-axis, the tab and the inwardly facing channel section positioned in the second cavity to retain the second data card in place when the second data card is received in the second data card receiving cavity.

2. A tray module in accordance with claim 1 wherein the first data card receiving cavity is complementarily configured to only receive a first data card and the second data card receiving cavity is complementarily configured to only receive a second data card.

3. A tray module in accordance with claim 1 wherein second rail is separated along a y-axis sufficiently to provide a boundary around at least a portion of the first and the second data cards along the y-axis.

4. A tray module in accordance with claim 1 wherein second rail is separated along a y-axis sufficiently to provide a width boundary around at least a portion of the first and the second data cards along a y-axis, the distal portion of the first rail includes a channel section for receiving the second data card at an angle upon initial placement of the second data card.

5. A tray module in accordance with claim 1 wherein the proximal portion of the first and the second rails includes inwardly extending ledges adapted to support the first data card.

6. A tray module in accordance with claim 1 wherein the tray module includes a middle support section being substantially parallel to the door, the middle support section connecting a middle section of the first rail and a second rail.

7. An assembly comprising:
a tray module, including;
a door,
a first rail extending from the door, the first rail having a proximal portion proximate the door and a distal portion, the distal portion of the first rail including an inwardly facing channel section,
a second rail extending from the door, the second rail having proximal portion proximate the door and a distal portion, the distal portion of the second rail including an inwardly extending tab,
a first data card receiving cavity for receiving a first data card, the first data receiving cavity between the first and the second rail,
a second data card receiving cavity for receiving a second data card, the second data receiving cavity between the first rail and the second rail, and the first and the second data card receiving cavities are aligned along an x-axis, the tab and the inwardly facing channel section positioned in the second cavity to retain the second data card in place when the second data card is received in the second data card receiving cavity; and
a tray receptacle, including an opening configured to receive the tray module, a shelf, and spring contacts carried on the shelf.

8. The assembly in accordance with claim 7 wherein the shelf includes a proximal section and a distal section, the proximal section including a first set of contacts for connection to the first data card when the first data card is inserted into the first data card receiving cavity.

9. The assembly in accordance with claim 7 wherein the shelf includes a proximal section and a distal section, the distal section including a second set of contacts for connection to the second data card when the second data card is inserted into the second data card receiving cavity.

10. The assembly in accordance with claim 7 wherein the shelf includes a proximal section and a distal section, the distal section including a second set of contacts for connection to the second data card when the second data card is inserted into the second data card receiving cavity, wherein the first rail and the second rail terminate short of the second set of contacts.

11. The assembly in accordance with claim 7 wherein the first rail and the second rail terminate at a predetermined length along the x-axis.

12. The assembly in accordance with claim 7 wherein the assembly includes a locking mechanism including at least one of a push-push mechanism and push-pull mechanism.

13. The assembly in accordance with claim 7 wherein the tray module comprises an installable and removable data card access tray utilized in a wireless communication device.

14. The assembly in accordance with claim 7 wherein the tray module is moveable from an open position extending outwardly from an electronic device for access to a closed position disposed in an interior of an electronic device.

15. The assembly in accordance with claim 7 wherein the first data card and the second data card include at least one of: a subscriber identity module card (SIM card), full-size SIM $1^{st}$ form factor (1FF) card, mini-SIM $2^{nd}$ form-factor (2FF) card, micro-SIM $3^{rd}$ form-factor (3FF) card, nano-SIM $4^{th}$ form-factor (4FF) card, secure device card (SD card), standard SD card, miniSD card, microSD (uSD) card, memory card, storage card, and expanded external memory card.

16. The assembly in accordance with claim 7 wherein the tray module is generally rectangular and has a narrow profile.

17. A wireless communication device, comprising:
a housing;
a controller coupled to the housing, the controller configured to control the operations of a wireless communication device; and
an inline tray assembly carried in the housing, the inline tray assembly including a tray module and a tray receptacle, the tray module configured to receive multiple different data cards, wherein:
the tray module includes:
a door,
a first rail and a second rail extending from the door and including a proximal portion and a distal portion, the distal portion of the first rail including an inwardly facing channel section and the distal portion of the second rail including an inwardly extending tab,
the first rail and the second rail providing a first data card receiving cavity for receiving a first data card and a second data card receiving for receiving a second data card, the first and the second data card receiving cavities aligned along an x-axis, the tab and the inwardly facing channel section to retain the second data card in when the second data card is received in the second data card receiving cavity, and
the tray receptacle has an opening configured to receive the tray module.

18. The wireless communication device in accordance with claim 17 wherein the first data card receiving cavity is complementarily configured to only receive the first data card and the second data card receiving cavity is complementarily configured to only receive a second data card.

19. The wireless communication device in accordance with claim 17 wherein the tray receptacle includes a shelf including a proximal section and a distal section, the proximal section including a first set of contacts for connection to the first data card when the first data card is inserted into the first data card receiving cavity, wherein the first rail and the second rail terminate short of the first set of contacts.

* * * * *

UNITED STATES PATENT AND TRADEMARK OFFICE
CERTIFICATE OF CORRECTION

| | | |
|---|---|---|
| PATENT NO. | : 9,203,458 B2 | Page 1 of 1 |
| APPLICATION NO. | : 13/652892 | |
| DATED | : December 1, 2015 | |
| INVENTOR(S) | : Timothy J. Sutherland et al. | |

It is certified that error appears in the above-identified patent and that said Letters Patent is hereby corrected as shown below:

In the Claims:

Claim 7, Column 7, Line 13, please change "having proximal portion" to -- having a proximal portion --

Claim 7, Column 7, Line 17, please change "first and" to -- first rail and --

Claim 17, Column 8, Line 35, change "receiving for receiving" to -- receiving cavity for receiving --

Signed and Sealed this
Sixteenth Day of February, 2016

Michelle K. Lee
*Director of the United States Patent and Trademark Office*